United States Patent [19]

Berry, Jr.

[11] 4,210,406
[45] Jul. 1, 1980

[54] DRILL WITH REPLACEABLE INSERTS

[75] Inventor: Robert W. Berry, Jr., Hazel Park, Mich.

[73] Assignee: Fansteel Inc., North Chicago, Ill.

[21] Appl. No.: 938,765

[22] Filed: Sep. 1, 1978

[51] Int. Cl.² ............................................. B23B 51/00
[52] U.S. Cl. .................................. 408/223; 408/713
[58] Field of Search ............... 408/186, 199, 211, 223, 408/224, 231, 238, 239, 240, 705, 713; 407/48, 103

[56] References Cited

U.S. PATENT DOCUMENTS

| | | | |
|---|---|---|---|
| 3,176,377 | 4/1965 | Milewski | 407/103 |
| 3,816,018 | 6/1974 | Hlocky | 408/238 |
| 3,963,365 | 6/1976 | Shallenberger et al. | 408/186 |
| 4,124,328 | 11/1978 | Hopkins | 408/223 |
| 4,149,821 | 4/1979 | Faber | 408/199 |

Primary Examiner—Harrison L. Hinson
Attorney, Agent, or Firm—Barnes, Kisselle, Raisch & Choate

[57] ABSTRACT

A drill body for drilling solid metal and for finish boring having, at the working end, two or more replaceable, indexable, hard metal inserts dimensioned and spaced radially to cut equal volumes of metal. The inserts are retained in pockets by a headed screw with a through passage for a wrench. The outside insert is also shaped and positioned so the drill body may be shifted radially from the drilling axis and used as a boring bar.

3 Claims, 9 Drawing Figures

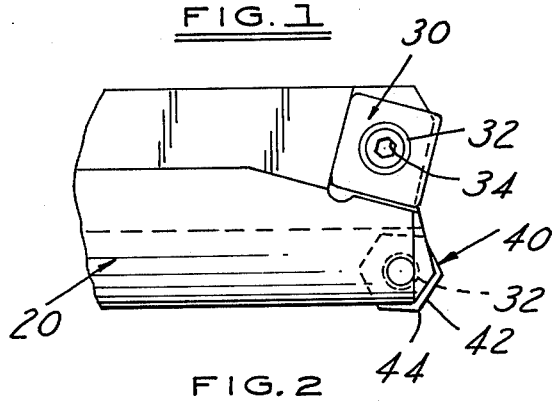
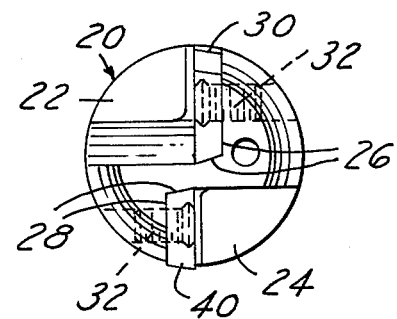
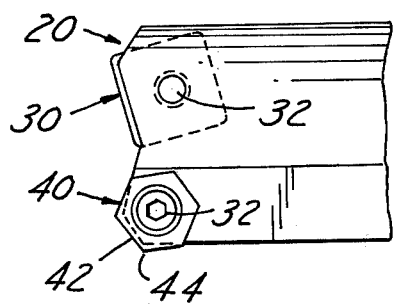
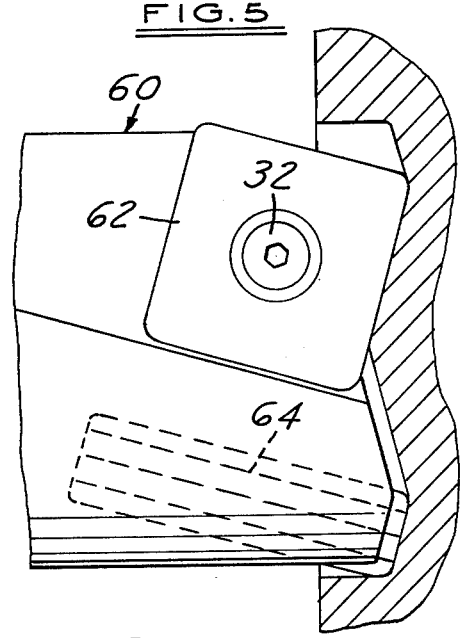
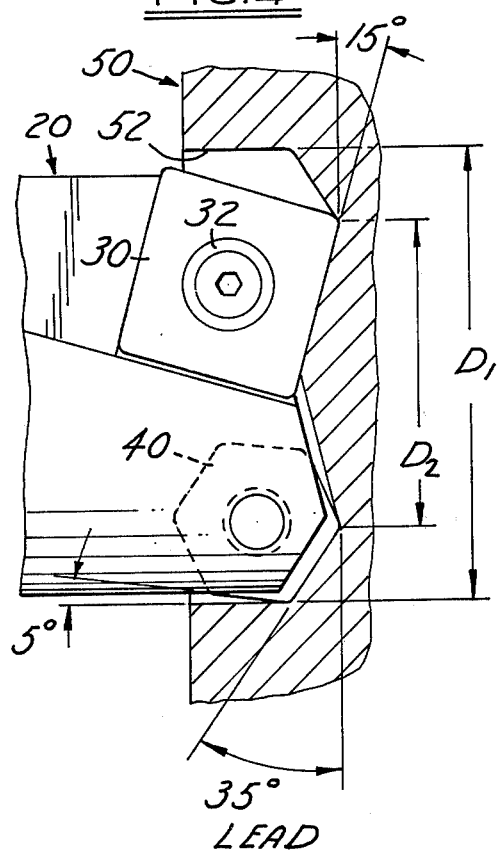
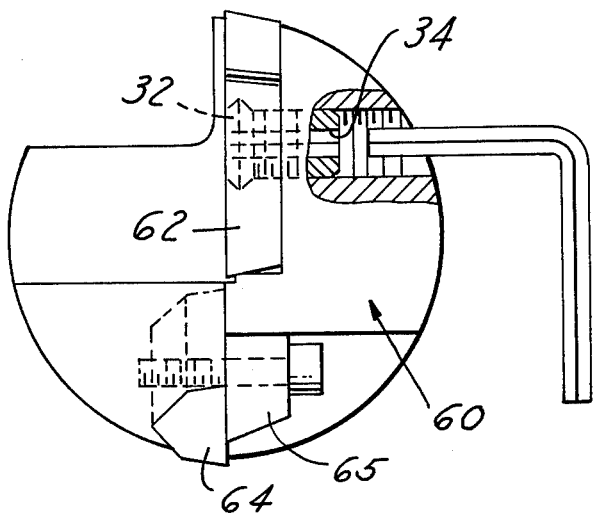

DRILL WITH REPLACEABLE INSERTS

FIELD OF INVENTION

Drills for entering solid material and having replaceable and indexable hard metal inserts.

BACKGROUND OF INVENTION:

Hard metal (tungsten carbide), wafer-like inserts of the indexable, replaceable (throwaway) type have been used in milling cutters for a number of years, as well as in single point tools. Boring bars have also used these inserts carried in removable cartridges as exemplified in U.S. Pat. No. 3,152,493, to Sullivan, dated Oct. 13, 1964. A milling cutter with replaceable inserts is shown in a U.S. Pat. No. 3,757,397, to Lindsey, dated Sept. 11, 1973. Another example of a boring bar is shown in a U.S. Pat. No. 4,030,843, to Harp, dated June 21, 1977, where the inserts are clamped in axial side slots. A drill using throwaway inserts is shown in a U.S. Pat. No. 3,540,323, to Rishel, dated Nov. 17, 1970. This patent shows the use of a central retainer pin which pushes the insert into contact with a retaining pocket.

The above patent to Rishel illustrates what is believed to be a typical approach to a replaceable insert drill where the inserts are spaced radially to cut an equal amount diametrically of the hole.

The concept of the present invention for a replaceable insert drill lies in the selection, positioning and shaping of the inserts on the drill body so that the cutting action of each tooth is equalized. The amount of work done by each tooth is by design and location such that the volume of chip removal for each tooth per revolution is approximately equal. For example, as a particular hole gets larger in diameter, the circumference increases, causing teeth at the larger diameters to remove more material than those at the smaller diameter for each revolution of the drill. With the present invention, the volume of material to be removed by each tooth is equalized. The torque in the drill body is more evenly divided with this arrangement, thus removing one of the causes of chatter. Also, the volume of chips from each blade is equal, thus making chip removal easier.

The present invention also contemplates a tool which can be used as a boring bar finishing tool by simply shifting it radially a small amount. In an automatic tool set up, this has many advantages relative to time by reducing the required number of tool stations and the like.

Other features of the invention include the fastening means for the inserts and other details will be found in the following description and claims in which the principles of the invention are further set forth together with details to enable a person skilled in the art to practice the invention, all in connection with the best mode presently contemplated for the invention.

BRIEF DESCRIPTION OF THE DRAWINGS

DRAWINGS accompany the disclosure, and the various views thereof may be briefly described as:

FIG. 1, a face view of a drill with replaceable inserts.
FIG. 2, a back view of the drill of FIG. 1.
FIG. 3, an end view of the drill of FIGS. 1 and 2.
FIG. 4, an enlarged view showing the drill as it engages a workpiece.
FIG. 5, a modified drill using an elongate insert at the outer diameter.
FIG. 6, an end view of the drill of FIG. 5.

DETAILED DESCRIPTION OF THE INVENTION

Figure 7:
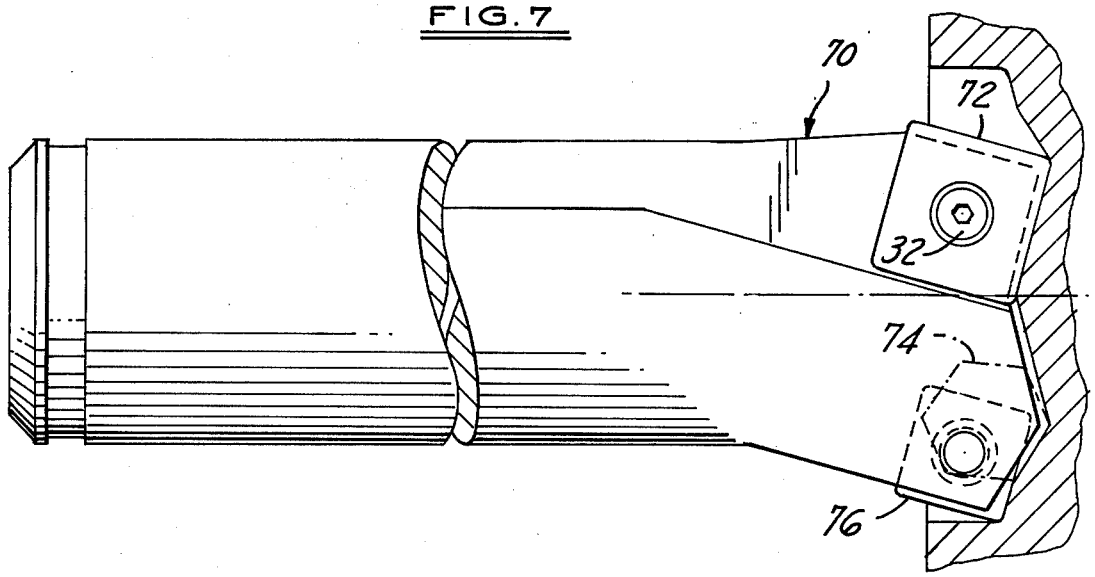
FIG. 7, a side view of a drill utilizing three inserts.

REFERRING TO THE DRAWINGS, in FIG. 1, a drill body 20 has lateral cut-away portions 22 and 24 on each side which end in insert pockets 26 and 28 positioned chordally relative to the axis of rotation. A square insert 30 is positioned in pocket 26 and held by a hardened screw 32, in a threaded hole, the screw having a small shallow head recessed into the insert 30 to be out of the way of chips. The screw has a wrench passage 34 (FIG. 6) extending axially from end to end so that a wrench may be inserted from either end to tighten or loosen the screw. The length of the wrench passage 34 insures a firm and solid wrench contact which prevents stripping of the corners.

The insert 30 preferably is a square insert in this modification with sides angled away from the cutting edge to provide a positive rake.

If the pocket 28 is a hexagonal insert 40 also held by a recessed screw 32 and having also the back-off angles on the sides which provide a positive rake cutting action. The insert 40 has an edge 42 which will be active in the plunge cutting and a corner 44 which will define the outer wall of the hole.

The tool geometry is illustrated best in FIG. 4 where the tool is shown entering a workpiece 50. The insert 30 has a leading edge which extends over center, i.e., beyond the axis of rotation so that it is removing the center stock and the surrounding material. The insert 40 removes the material outside the area cut by the insert 30 and determines the diameter of the hole 52.

In FIG. 4, the dimension $D_1$ is the intended diameter of the hole while the dimension $D_2$ is the diameter of the area swept by the center insert 30. The diameters $D_1$ and $D_2$ and the length of the sides of the inserts 30 and 40 are determined to provide equal areas swept by the two inserts respectively. The total area $A_1$ is $\pi r_1^2$ where $r_1$ is radius of $D_1$, and $A_1$ equals $(\pi D_1^2)/4$. The inner sweep area $A_2$ is $\pi r_2^2$ which is $(\pi D_2^2)/4$ where $r_2$ is the radius of $D_2$. Thus, area $A_1$-$A_2$ equals the area swept by the outer insert 40. Area $A_2$ which is swept by insert 30 is equal to the area $A_1$-$A_2$. This can be readily determined and the inserts designed to cut the equal areas and thus equal volumes of material on each revolution.

In FIG. 5, a drill body 60 has a square insert 62 to cut the inner sweep and an elongate slug-type insert 64 to make the outer sweep. Suitable clamping means 65 can be used to hold the insert 64 in place.

In FIG. 7, a drill body 70 is shown for use in larger diameter cuttings utilizing three inserts. First, a square insert 72 takes the center cut. An intermediate hexagonal insert 74 takes the next sweep. A square insert 76 takes the outer sweep.

Figure 8:
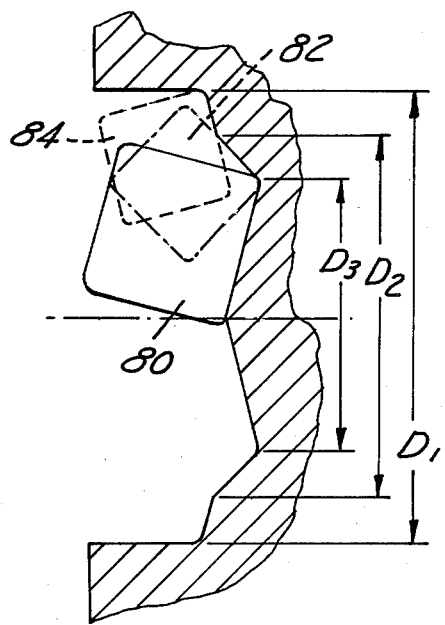
FIG. 8, a diagrammatic view showing a three-insert set up and illustrating the overlap.
Figure 9:
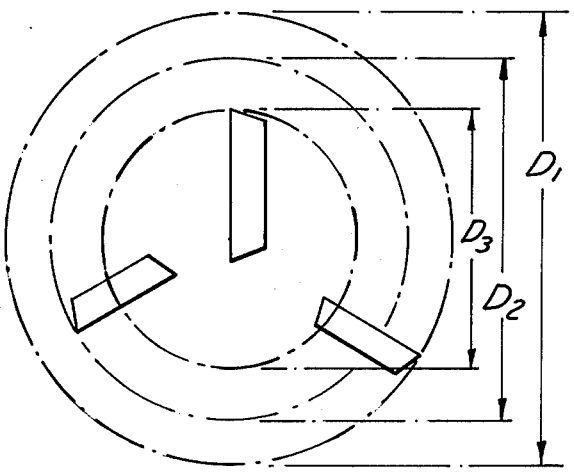
FIG. 9, a diagram showing insert placement in a three-insert drill.

In FIG. 8, a three-insert drill is also shown diagrammatically with three square inserts 80, 82 and 84 overlaid to show the distribution of the cuts. In FIG. 9, the inserts are shown distributed circumferentially around the drill body and the three diameters $D_1$, $D_2$ and $D_3$ are shown. The mathematics is again simple in that the areas of the total hole $D_1$ is divided equally and each insert cuts the same area and the same volume of material.

In each case, the area at the greatest diameter has the narrowest cutting band and the greater resistance, because of the distance to the center, is offset by the narrower band. Thus, the cutting distribution is equalized to provide an even cutting resistance and also even cutting chip volume from each insert.

It will be seen that the use of a hexagonal insert at the outer sweep provides six indexes for this insert. If the drill is used in a situation where a final boring cut is desirable after drilling, the drill body may be shifted radially of the hole and the outer insert will provide the final finishing cut on the wall of the drilled hole. In this circumstance, the additional indexes for the outer insert will compensate for the additional wear due to the finishing cut.

In automatic tape controlled machines, this ability to drill and ream will save much time and avoid a separate station for the second cut.

I claim:

1. A drill comprising a body having a working end and a drive end with chordal support surfaces adjacent recesses in the working end distributed circumferentially about the axis of the body, cutting inserts retained on said support surfaces having cutting edges disposed toward and projecting from the cutting end of said body, said cutting edges being radially spaced conjointly to sweep the entire area of a working piece to be drilled and dimensioned wherein each cutting edge sweeps a substantially equal area of the entire area to be drilled, said inserts being indexable, wafer-like inserts of hard metal including a square insert disposed to cut the central portion of the entire area to be drilled and a hexagonal insert to cut a circumferential area outside the central portion.

2. A drill comprising a body having a working end and a drive end with chordal support surfaces adjacent recesses in the working end distributed circumferentially about the axis of the body, cutting inserts retained on said support surfaces having cutting edges disposed toward and projecting from the cutting end of said body, said cutting edges being radially spaced conjointly to sweep the entire area of a working piece to be drilled and dimensioned wherein each cutting edge sweeps a substantially equal area of the entire area to be drilled, said inserts being indexable, wafer-like inserts of hard metal including a square insert disposed to cut the central portion of the entire area to be drilled, a hexagonal insert to cut an intermediate circumferential area outside the central portion, and a square insert to cut a final circumferential area outside the intermediate area.

3. In a drill comprising a body to be in rotative relationship with a workpiece and having a working end and a chucking end with chordal surfaces adjacent recesses in the working end distributed circumferentially about the rotative axis of the body, that improvement which comprises:

(a) cutting inserts including square and hexagonal inserts retained on said support surfaces having cutting edges disposed toward and projecting from the cutting end of said body, said inserts being spaced radially and positioned with the edges overlapping to make a full cut of a surface of a workpiece contacted by the end of the drill, each cutting edge being dimensioned and spaced radially to sweep, in relative rotation with a workpiece, a circumferential area of the workpiece substantially equal to the area swept by each other cutting edge so that the quantity of chips removed from the workpiece by each cutting edge is relatively equal.

* * * * *